United States Patent [19]

Jones

[11] Patent Number: 5,135,820
[45] Date of Patent: Aug. 4, 1992

[54] APPARATUS FOR RECIRCULATION OF BATTERY ELECTROLYTE AND METHOD OF USING SAME

[76] Inventor: William E. M. Jones, 234 McKean Rd., Ambler, Pa. 19002

[21] Appl. No.: 655,758

[22] Filed: Feb. 14, 1991

[51] Int. Cl.⁵ .............................................. H01M 2/40
[52] U.S. Cl. ......................................... 429/49; 429/80; 429/95
[58] Field of Search .................... 429/49, 70, 80, 95

[56] References Cited

U.S. PATENT DOCUMENTS

| | | |
|---|---|---|
| 1,580,493 | 4/1926 | Johnson . |
| 1,781,005 | 11/1930 | Gill . |
| 1,823,549 | 9/1931 | Kendall ........................... 285/156 X |
| 1,837,242 | 12/1931 | VanMeter, Jr. . |
| 1,942,908 | 1/1934 | Swain et al. . |
| 2,039,542 | 5/1936 | Lindquist . |
| 2,161,776 | 6/1939 | Orr . |
| 3,664,876 | 5/1972 | Carl . |
| 3,979,222 | 9/1976 | Pompon . |
| 4,377,445 | 3/1983 | Grimes . |
| 4,386,141 | 5/1983 | Weidner et al. . |
| 4,415,847 | 11/1983 | Galloway . |
| 4,527,593 | 7/1985 | Campau ............................ 137/805 |
| 4,532,953 | 8/1985 | Rysewyk ........................ 429/49 X |
| 4,556,093 | 12/1985 | Jones ................................. 141/206 |
| 4,628,011 | 12/1986 | Feldman et al. ..................... 429/49 |
| 4,858,964 | 8/1989 | Usui ................................... 285/156 |
| 4,971,780 | 11/1990 | Spitz ............................... 429/49 X |

FOREIGN PATENT DOCUMENTS 2112998  7/1983  United Kingdom .................. 429/95

*Primary Examiner*—Stephen Kalafut
*Attorney, Agent, or Firm*—Ferrill, Logan, Johns & Blasko

[57] ABSTRACT

The present invention provides method and apparatus for the automatic recirculation of battery electrolyte from industrial and similar batteries. The invention employs a vacuum system to remove electrolyte from a cell of the battery, transfer it to a central location where it can be treated, and then return it to the battery for its continued use. The invention lends itself to many forms of electrolyte treatment, including temperature adjustment, filtering, and removal of excess gases. The invention may be readily employed on virtually all industrial batteries with minimal modification and effort, and it greatly decreases maintenance time and expense for such batteries while increasing their flexibility and uses.

23 Claims, 4 Drawing Sheets

APPARATUS FOR RECIRCULATION OF BATTERY ELECTROLYTE AND METHOD OF USING SAME

BACKGROUND OF THE INVENTION

1. Field of the Invention

The present invention relates to apparatus and method for recirculating electrolyte of a electric storage battery. More particularly, the present invention provides apparatus and method for removing, treating, and replacing electrolyte of a multiple cell industrial-type battery.

2. Description of the Prior Art

Large industrial batteries are widely employed today in many industries. These batteries are commonly used to power various stationary systems, such as telephone exchanges, as well as many forms of mobile equipment, such as fork lift trucks. Despite wide spread use of such batteries and the many commercial and environmental advantages they provide, the problems inherent with the operation of industrial batteries prevent them from being even more widely utilized.

Most of the problems associated with industrial batteries is that they require constant service during their normal operation of repeated discharging and recharging.

The first problem with these batteries is that they require constant addition of water to compensate for losses due to evaporation and electrolysis during charging. Manual watering of battery cells is generally time consuming and expensive. It is also an unpleasant task so watering is often ignored to the detriment of the battery's performance and longevity.

A second problem is that batteries get hot, particularly those in severe, deep-cycle service. High battery temperatures have a very damaging effect on a battery's durability. In general, battery cooling systems have been complex and expensive. They are used in submarine and other exotic applications, but seldom in commercial battery designs. A third and related problem is that rapid re-charging causes heat buildup in a battery. Therefore, the rate at which a battery can be charged is limited by the lack of a cooling system. Since fast charging has a great appeal to some battery users, this limitation has far-reaching commercial repercussions.

A fourth problem is that batteries produce hydrogen and oxygen gasses during charging which can cause explosions if the gasses are not properly vented. This forces a user to ventilate the battery charging room which adds to heating and cooling costs of the space. A fifth and related problem is that some lead-acid batteries are made with special alloys suitable for deep cycle service on fork lift trucks and similar equipment. These batteries can produce poisonous gasses containing stibene (antimony) and arsine (arsenic). Again, forced ventilation is required.

A sixth problem is that batteries are often watered incorrectly, causing flooding of battery electrolyte from the cells causing corrosion and damage to vehicles and property. A seventh and related problem is that when electrolyte is lost from the battery cells, it must be replaced. This is a difficult procedure, not without danger, and one often ignored to the detriment of battery performance.

An eighth problem is that, during cycling, battery plates tend to shed active material and cause short circuits in the cells. Various separators and protective devices are used to counter this action, but ultimately many batteries fail due to these short circuits even though they may otherwise be in good condition. Existing battery designs do not allow for the replacing or filtering of electrolyte.

Additionally, in order to maximize the life of the battery and to assure full performance, it is known that adequate rest period and cooling of the battery is important prior to reinstallation. This rest period, which generally requires up to eight (8) hours unassisted, is necessary to dissipate heat generated due to build up of ohmic resistances during discharge and the chemical reconversion of active materials in the charge regime.

Due to time constraints, many users ignore the battery manufacture's instructions concerning adequate time for cool down. This results in seriously shortened battery life. The heat problem in batteries is complicated by the fact that battery cells located in the interior of a multiple cell battery have significantly less exposed surface area to permit cooling and are therefore prone to premature aging relative to the rest of the battery.

In an attempt to solve some of these problems, a number of partial solutions have been suggested. In U.S. Pat. No. 1,837,242 issued Dec. 22, 1931, to Meyer, an apparatus is disclosed for filling multiple battery cells simultaneously. Although this system may solve the limited watering problem, it does not solve heat build-up problems or permit removal and treatment of electrolyte. Such devices have the additional problem of water line freeze-up at low temperatures which can limit their use. Another partial solution may be found in U.S. Pat. No. 4,415,847 issued Nov. 15, 1983, to Galloway. In that patent a method and apparatus is proposed for providing a cooling liquid, such as anti-freeze, to the battery to help to reduce heat build-up. Unfortunately, this system appears far too complex for practical implementation, and it does not address any of the other maintenance problems discussed above.

Applicant is aware of at least one previous proposal for the removal and cooling of electrolyte on an experimental basis. This method called for the electrolyte to be piped out the battery cells under pressure via one output manifold; the electrolyte was then pumped into an external tank of cool electrolyte and then piped back again through a separate second input manifold. Although this system met with some limited experimental success, it is believed that it has not been implemented beyond experimental applications due to a number of practical problems.

The experimental electrolyte recirculation system created a number of new problems which have seriously limited its acceptance. One major problem with this system was that the multiple manifolds were too cumbersome and complex for use with production batteries. As such, the system required substantial modification of commercial battery design, as well as installation, surveillance and maintenance of numerous hoses and connections. Moreover, the positive pressure driving the system actually multiplied maintenance problems—such as causing leaks, hose connection blow off, and increased gas pressure hazards.

Accordingly, it is a primary object of the present invention to provide an method and apparatus for battery maintenance which cools electrolyte, decreasing charging time and improving battery life, while also automatically watering the batteries and equalizing electrolyte concentration between battery cells.

It is a further object of the present invention to provide such a method and apparatus which readily permits the removal of electrolyte from the battery for temperature adjustment or other treatment and its automatic return to the battery.

It is an additional object of the present invention to provide such a method and apparatus which is easily implemented with existing battery designs, and which may be practically employed on commercial vehicles and in other applications with minimal installation time and on-going supervision.

It is another object of the present invention to provide such a method and apparatus which is of limited size and complexity so that it may be employed on commercial vehicles to allow the treatment of electrolyte while the battery is in use.

It is yet another object of the present invention to provide a method and apparatus that will allow more efficient, convenient, economical and safe charging of batteries during the manufacture of the batteries themselves.

Other objects of the present invention should become evident from review of the following specification.

SUMMARY OF THE INVENTION

The present invention provides an improved apparatus and method for the removal, treatment and return of battery electrolyte to multiple cell batteries. It is particularly useful for the recirculation of electrolyte in industrial batteries employed in heavy equipment, such as fork lift trucks.

The preferred embodiment of the invention employs a vacuum system and, in its simplest form, a single tube or conduit to carry liquid electrolyte from cell to cell in a battery via a series connection. A set of such cells may also be connected in parallel to make a series/parallel arrangement. Pressure may be used either instead of or in combination with the vacuum.

In operation, electrolyte is withdrawn through fluid junctions in each cell and delivered to a centralized tank where various electrolyte treatment steps may be performed. Such treatment may include filtering, temperature adjustment, and venting of harmful gases. Once treated, the electrolyte is withdrawn from the tank via the vacuum system and returned to the battery. The use of a vacuum system avoids chemical spillage by disconnected hoses and leaks, and reduces the risk of excess gas pressures and possible explosions due to fast charging or other vigorous handling of the battery. Various junction designs are disclosed to aid in the removal and return of electrolyte.

The present invention provides method and apparatus to assure equalized electrolyte concentrations and temperature throughout the battery, and to decrease vastly the amount of time and effort required to service batteries. Moreover, the present invention provides greatly improved flexibility in using, recharging, and servicing batteries which should improve their performance, durability and convenience. One such use is to employ such systems on battery powered vehicles to provide constant maintenance of the battery—improving battery life and performance. In such an embodiment the battery support system can be mounted on the vehicle during operation to provide a boost in battery capacity and life.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides apparatus and method for the removal, treatment, and return of electrolyte from all forms of wet cell batteries, and particularly multi-cell industrial-type batteries commonly employed in heavy equipment, such as fork lift trucks.

Figure 1:
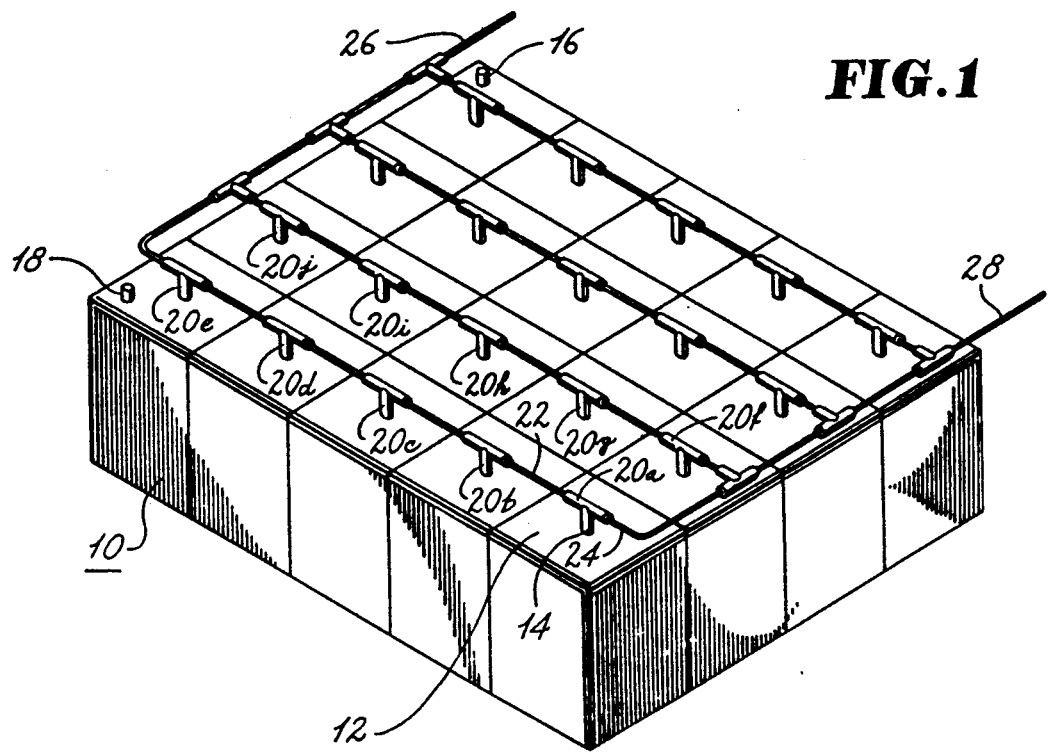
FIG. 1 is a three-quarter isometric view of a conventional multi-cell industrial battery with junctions of the present invention attached to each cell.

Shown in FIG. 1 is a typical industrial battery 10 commonly employed today. This particular battery 10 includes some twenty cells 12, each having an opening 14 to permit each cell 12 to be watered or otherwise serviced, and at least one positive terminal 16 and at least one negative terminal 18. As is regularly employed, each of the cells 12 of this battery 10 is connected internally to an adjacent cell in series to provide electrical flow between the positive and negative terminals 16, 18. It should be appreciated that industrial batteries commonly may have anywhere between a few cells to as many as hundreds of cells and that the present invention may be employed with all such batteries—with the invention providing greater benefit as the number of cells increases.

To employ the present invention, the interior of each cell 12 is accessed by removal of a vent cap (not shown) in each opening 14. A junction 20 is then inserted into each opening 14 to provide a relatively air-tight connection. Each junction 20 is provided with a removal conduit 22 and a return conduit 24. As seen in FIG. 1, the junctions 20 may be connected to one another in series, as is shown with junctions 20a through 20e and 20f through 20j, and/or in parallel, as junctions 20a-20e are relative to junctions 20f-20j. In a series connection, the removal conduit 22 of a first junction 20 serves as the return conduit 24 for the next junction 20 in the series. A main removal conduit 26 and a main return conduit 28 is provided to transfer electrolyte between the battery 10 and treatment apparatus.

Figure 2:
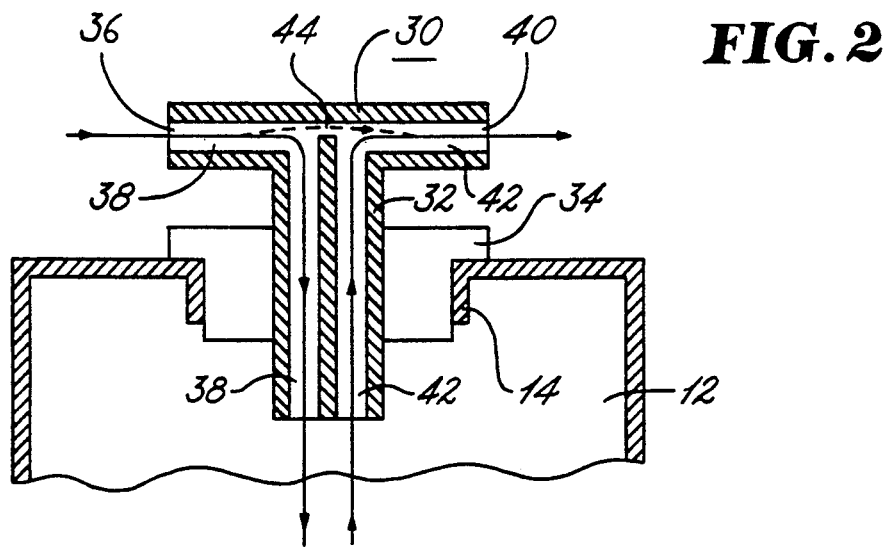
FIG. 2 is a cross-sectional view of one embodiment of a junction employed with the present invention.

Examples of junctions which may be used with the present invention are shown in FIGS. 2 through 5. FIG. 2 shows a T-shaped junction 30 inserted into an opening 14 in a battery cell 12. The junction 30 includes a conduit casing in the form of a vertical housing 32 and an adaptor 34, which provides a tight but rotatable fit for the housing 32 within the opening 14. Junctions 30 for the present invention may be readily adapted to fit various sized openings by merely substituting various sizes of adaptors 34.

The interior of the housing 32 comprises: an intake orifice 36, which attaches to a return conduit 24; an intake track 38, which communicates between the intake orifice 36 and the cell 12; an outlet orifice 40, which attaches to a removal conduit 22; and an outlet track 42, which communicates between the cell 12 and the outlet orifice 40.

As is explained below, it is often beneficial to provided for the separation of gas and electrolyte so that gases contained in transfer conduits need not enter each cell in the operation of the present invention. In the embodiment shown in FIG. 2, a by-pass opening 44 is provided between the intake track 38 and the outlet track 42 which permits gas to pass between the intake and outlet tracks without entering the cell 12.

Figure 3:
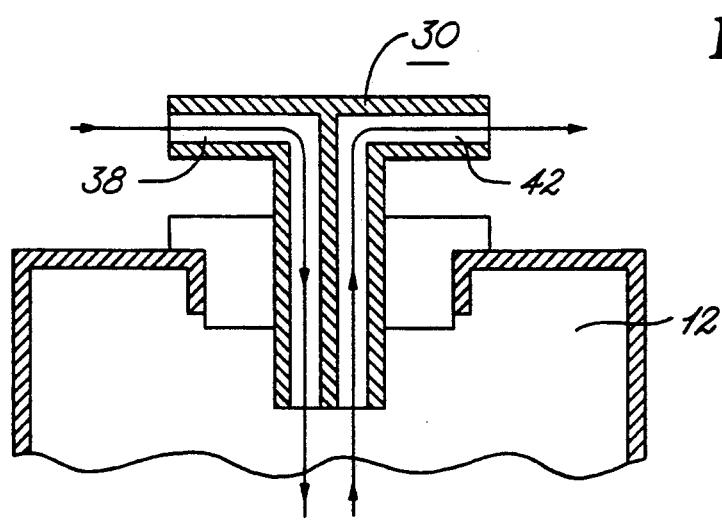
FIG. 3 is a cross-sectional view of another embodiment of a junction employed with the present invention.

The embodiment shown in FIG. 3 is identical to that shown in FIG. 2, except that the intake track 38 and the outlet track 42 are not connected intermediate their ends. Without a by-pass opening 44, this embodiment provides for flow of all fluid into the cell 12.

Figure 4:
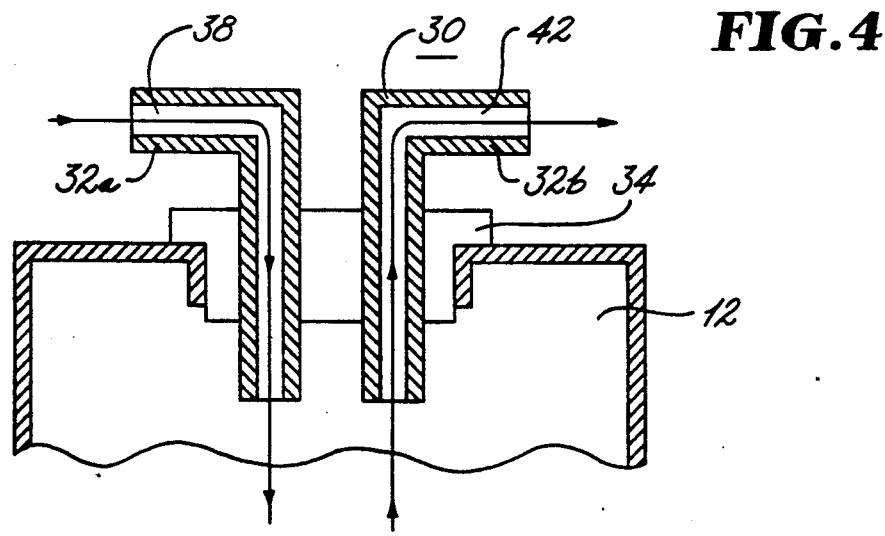
FIG. 4 is a cross-sectional view of a third embodiment of a junction employed with the present invention.

The T-shaped junction 30 of the embodiment shown in FIG. 4 also makes no provision for the separation of gas from electrolyte. That junction 30 provides separate conduit casings 32a and 32b for the intake track 38 and the outlet track 42, respectively. Each of the conduit casings 32a and 32b are attached to a single adaptor 34.

Figure 5:
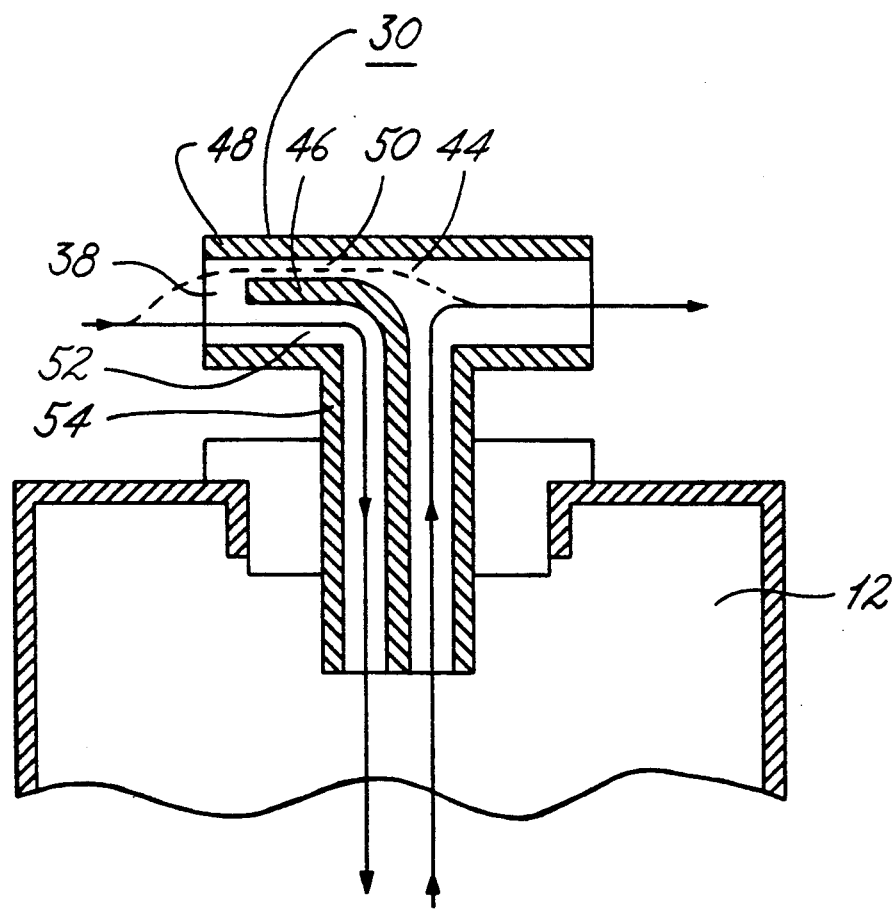
FIG. 5 is a cross-sectional view of a forth embodiment of a junction employed with the present invention.

An improved apparatus for the separating gases and electrolyte is shown in FIG. 5. In that embodiment, a divider 46 is provided ion the intake track 38 in its horizontal section 48 which bisects the intake track 38 into an upper portion 50, which directs gas flow through opening 44, and a lower portion 52, which directs electrolyte flow into the cell 12 via the intake track's vertical section 54. It should be understood that the divider 46 may be oriented in any suitable position in the intake track 38 and may be constructed from any acid resistant material, including being molded integral with the conduit casing.

It should also be appreciated that other means may be substituted for assisting in the separation of gas and electrolyte without departing from the present invention. These may include without limitation: multiple dividers or bevels; screens or filters, such as electrolyte separator material, within or outside the junction; and/or channels or additional passages in or through the conduit casing. Additionally, in some applications it may be desirable to have a direct vent hole or valve (not shown) to the atmosphere or to a vent conduit to provide for the direct venting of gas from the junction 30.

Figure 6:
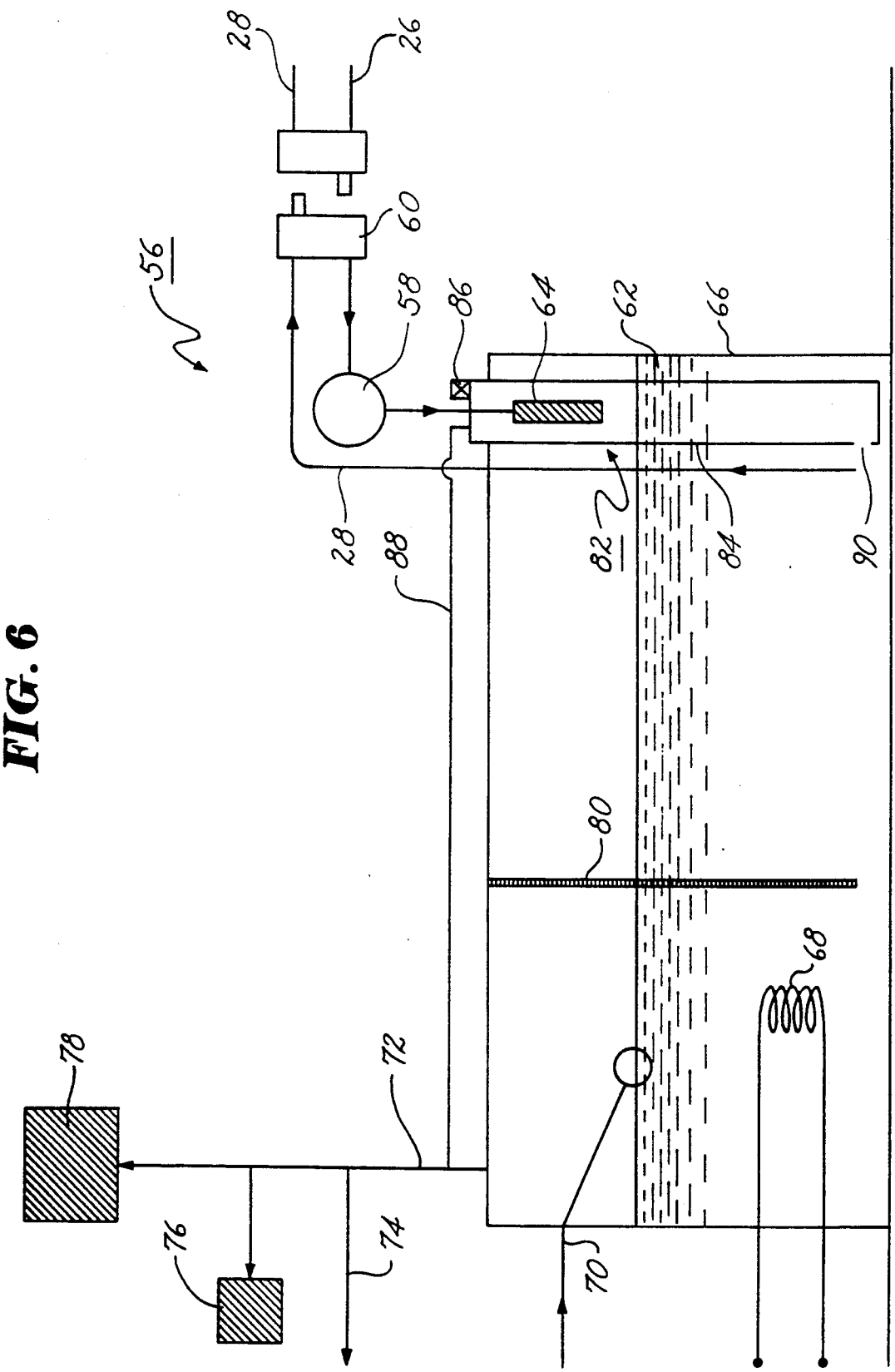
FIG. 6 is a schematic view of vacuum and treatment apparatus of the present invention.

The operation of the present invention may be understood with reference to FIG. 6. To transfer electrolyte between the battery 10 and treatment apparatus, the preferred embodiment of the present invention employs a vacuum system 56 which comprises the removal conduits 22, the main removal conduit 26, a vacuum generator 58, the main return conduit 28, and the return conduits 24.

In the preferred embodiment, the vacuum generator 58 is a positive displacement suction pump of which there are many existing types. Ideally, the pump should be capable of transferring sufficient electrolyte to provide complete recirculation of all electrolyte in the battery in less than the time required to recharge the battery. This is generally 4 to 14 hours. Experiments have shown that a pump having a flow rate of 1–2 gallons per minute (4–8 liters/min) will suffice for most batteries having 18 cells (i.e. a typical United States fork lift truck battery). Lager pumps can be used for more rapid circulation for special applications. A suitable vacuum may also be generated by use of a venturi arrangement.

A coupling 60 may be provided in the vacuum system 56 to permit the main removal conduit 26 and the main return conduit 28 to be easily attached and detached for the treatment of different batteries 10. By permanently attaching the junctions 20 and their associated removal and return conduits to a battery, the use of a quick-connect coupling 60 allows for the very rapid transfer of the vacuum system 56 and treatment apparatus between different batteries. Since the transfer of electrolyte is accomplished in the preferred embodiment by vacuum instead of pressure, the disconnecting of the coupling 60, or any other break in the transfer conduits, will result in minimal acid spillage—with most of the electrolyte flowing by gravity back into the battery 10.

Once electrolyte 62 is suctioned out of the battery 10 and through the vacuum generator 58, it may then be transferred to one or more various apparatus for treatment. One such treatment apparatus is a filter 64. As is known, removal of particulate matter and other impurities from electrolyte through filtering or other treatment can improve battery performance and increase battery life. In this respect, the present invention readily lends itself to the insertion of one or more filter elements to provide for regular or constant filtering of the electrolyte 62. Suitable filters include wound polypropylene varieties commonly used to filter sediment.

Another treatment which may be employed is to control the temperature of the electrolyte 62. In the preferred embodiment, electrolyte exiting the removal conduit 26 and vacuum generator 58, or the filter element 64 if employed, is deposited into a tank 66 maintained at or near atmospheric pressure. The tank can be provided with a heat exchanger 68, for example a coil submerged in the electrolyte 62. Depending on usage, the heat exchanger 68 may be either a heating or cooling coil to adjust the temperature of the electrolyte for optimum performance or life of the battery. A hot battery provides greater immediate performance at the expense of battery life; a cool battery has less immediate power, but much greater battery life and long-term performance. For most applications, the electrolyte of a battery should be maintained within a range of 20° to 35° C., and ideally within a range of 20° to 30° C.

A water line 70 may also be provided to the tank 66 to add water automatically to compensate for water lost by electrolysis and evaporation. This, in effect, makes the battery maintenance free in this respect which is of great commercial significance. If a check of the specific gravity of the electrolyte is required, a periodic sample may be taken from the tank or vacuum system to check specific gravity; alternatively, monitoring apparatus (not shown) may be provided in the tank 66 or elsewhere to sample the electrolyte automatically. One such monitor suitable for this use is a commonly available arrangement of balls of different densities, where the balls sink or float according to the density of the electrolyte.

The tank 66 may also be provided with one or more gas vent lines 72 for the removal of gases. Gases removed from the electrolyte may include hydrogen, oxygen, and, for lead-acid cells, stibene (antimony gas) and arsine (arsenic gas). The gas vent line 72 may include vents to the outside 74, vents through special gas scrubbing filters 76, and/or vents through a catalyst 78 which would recombine the hydrogen and oxygen to make water. Where a gas vent 72 is provided, a demister filter 80 may be provided in the tank 66 to precipitate any suspended droplets of electrolyte.

To minimize the risk of ignition of hydrogen in the tank, the removal conduit 26 carrying the mixture of liquid and gas may be provided with a liquid/gas separator 82. This may take the form of a strong tube 84 of relatively small diameter (e.g. 1 to 3 inches) to minimize trapped hydrogen. If an explosion occurs, it will be small and confined to this tube 84. An explosion plug 86 may be provided at the top of the tube to provide for the venting of any explosion and not harm the tank and its contents. Additionally, an explosion may be vented directly to gas vent 72 or through a conduit 88. At its lower end the tube 82 constricts to a relatively small hole 90 to allow passage of liquid during normal recirculation, but to provide very high flow resistance during an explosion. In this embodiment, the top of the tank 20 may be provided with a porous cover to prevent any accumulation of hydrogen even during system malfunction.

It should be emphasized the foregoing is only a sampling of possible treatments which may be performed on electrolyte once it is removed from the battery. Once the electrolyte 62 is treated it may then be returned to the battery 10 by the main return conduit 28 submerged in the electrolyte 62. The precise placement of the main removal conduit 26 and the main return conduit 28 in the tank 66 may be altered to address particular demands for treatment and segregation of treated and untreated electrolyte.

In the method of operation of the present invention, a vacuum is created throughout the vacuum system 56 by the vacuum generator 58. The draw of the vacuum generator 58 creates a negative pressure in the main removal conduit 26, in each individual removal conduit 22, in each cell 12 via each junction 20, in each return conduit 24, and in the main return conduit 28. Under the negative pressure, electrolyte is then withdrawn from each cell 12 via each junction's 20 outlet track 42 and removal conduit 22. Electrolyte is transferred through the removal conduit 22 and main removal conduit 26, through the vacuum generator 58, through the filter element 64, and into the tank 66 for treatment. The negative pressure in the main return conduit 28 withdraws treated electrolyte from the tank 66 and returns it to the cells 12 via the return conduits 24 and junctions 20.

The advantages of use of a vacuum to transfer electrolyte in the present invention are manifold. First, as has been noted, the vacuum virtually eliminates any risk of hose blow-off or spillage from hose leaks or separations. Further, the use of a vacuum eliminates the risk of excessive gas pressure in the battery which can result in explosions. The negative pressure of this system actually sucks unwanted gases out of the battery and delivers them to the tank 66 where they can be safely separated and vented out of the recirculation system. Use of a junction similar to the ones disclosed in FIGS. 2 and 5 further assists in the separation of gases from electrolyte.

Additionally, the elimination of excess gases allows the battery to be charged at rate much faster than is presently deemed advisable. As has been noted, very rapid charging of a battery results in high gas production which presents a significant risk of explosion and damage. With the effective gas removal and venting properties of the present invention, such rapid charging can be safely performed. Rapid charging is also made possible by the present invention's ability to adequately cool the electrolyte—eliminating the concern of excessive heat production during rapid charging.

A further advantage of the vacuum system of the present invention is that acid misting is fully controlled. Acid mist in the closed system is withdrawn to the tank 66 where it can be precipitate and/or safely vented to where it will cause minimal environmental damage.

The series connection between the cells of the battery also provides distinct advantages over presently available systems. The connection of cells in series, with electrolyte circulated evenly through all cells of the battery, assures that all cells are evenly watered, are all maintained at the same specific gravity, and are all maintained at the same temperature. This provides quick, simple and easy maintenance of all the cells of a battery from one central point. Further, the mixing of acid in each cell also avoids premature plate damage due to acid stratification. Moreover, uniformity among cells is assured—thus avoiding premature damage to certain cells from excess temperature build up or inconsistent maintenance. Also, as has been explained, the centralized maintenance of the battery permits ease in filtering and treating the electrolyte for the entire battery at a single location.

Perhaps the greatest benefit of the present invention is the ability to control the temperature of the electrolyte easily and safely. This avoids uneven and premature cell aging, and assures that every cell of the battery is maintained at optimum operating temperature.

In operation the present invention can be installed on the battery periodically to effect regular maintenance at a central location. As has been noted, the relatively inexpensive junctions 20 and conduits 22, 24, 26, 28 can be permanently installed on each battery to be serviced. In this manner, hook up and treatment of each and every cell of every battery can be accomplished with minimal labor or downtime. Furthermore, many of the environmental problems inherent with battery maintenance are circumvented, avoiding spillage risks, acid mist damage, and damage and injury from inadequate gas venting.

An even more promising benefit of the present invention is that the entire vacuum system and treatment apparatus is simple and lightweight enough that it may be permanently installed on the battery to provide constant service during operation. This will greatly extend battery life and performance through constant maintenance and provides endless possibilities for improved battery designs in the future. Such improvements include: greater battery capacity with greater acid supply—with no risk of overflow or explosion; availability of regular rapid charging; high capacity cells, with excess acid provided and regularly circulated from the attached tank; high voltage batteries well in excess of 72 volts; and heating and cooling options for extreme environmental conditions. Moreover, all batteries can be better monitored and controlled by having electronic sensors installed in the tank 66 to regularly sample and adjust all electrolyte passing through the batteries.

Figure 7:
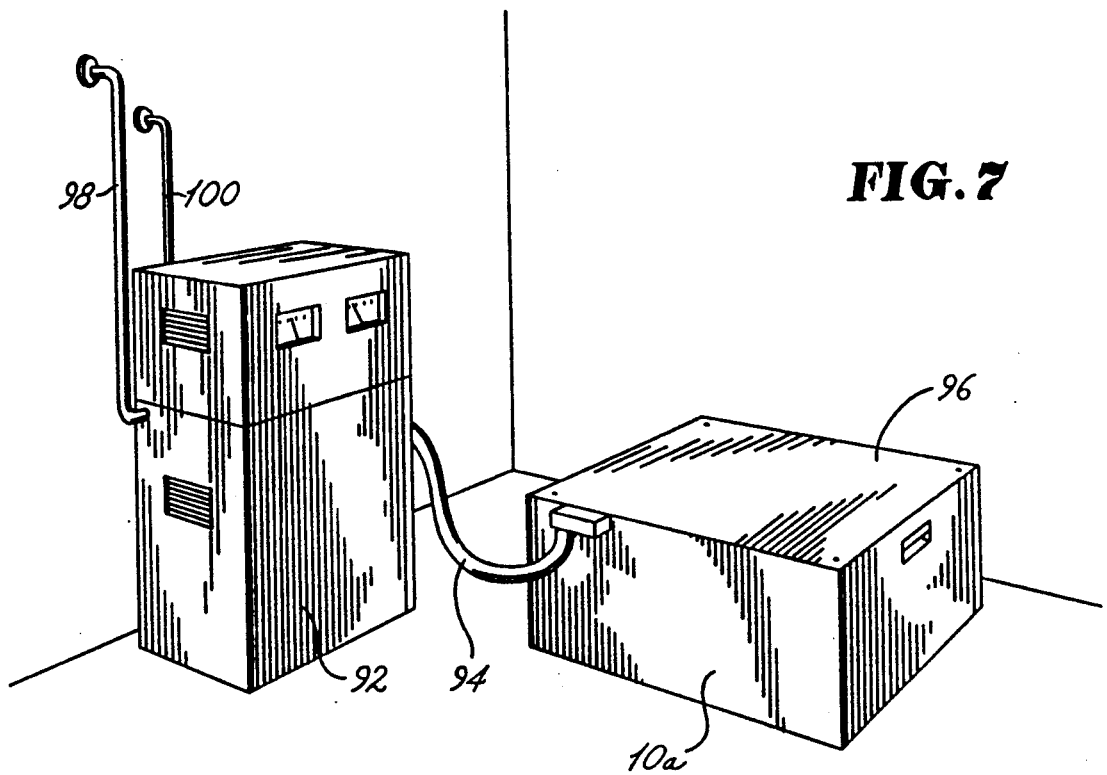
FIG. 7 is a three-quarter perspective view an industrial battery attached to a high capacity charger device incorporating the apparatus of the present invention.

One of the ultimate benefits of the present invention may be seen in FIG. 7. In this embodiment of the present invention, a typical industrial battery 10a (e.g. from a fork lift truck) can be attached to a dual recirculator/charger device 92 for rapid treatment. The battery is attached to the recirculator/charger 92 by a tube 94 which houses the main removal conduit and main return conduit as well as an electrical charging connection to the battery 10a. Due to the hands-off operation of the present invention, the battery can be sealed with bolted-on cover 96, which avoids fumes, acid mist, and other environmental problems. The recirculator/charger 92 can be provided with a gas exhaust line 98 and a water intake line 100. The industrial battery 10a can then be serviced in a completely clean environment, while enjoying all the operational advantages of the present invention already discussed above, including improved performance and rapid charging characteristics, and completely automated computer monitoring and maintenance. Such a "battery room" allows battery operations to be a clean, high tech "black box," and not the present complicated and "dirty" procedure it is today. Such a recirculator/charger 82 may also be employed with multiple batteries to reduce capital costs and/or with stationary battery installations.

While particular embodiments of the present invention have been illustrated and described herein, the present invention should not be limited to such illustrations and description. It should be apparent that changes and modifications may be incorporated and embodied as part of the present invention within the scope of the following claims.

What is claimed is:

1. An apparatus for removal and return of electrolyte of a multiple cell battery which comprises
   a vacuum system, including a removal conduit from the battery, a vacuum generator, and a return conduit to the battery;
   at least one junction attached to the battery, in communication with both the vacuum system and a cell of the battery;
   electrolyte treatment apparatus in communication with the vacuum system;
   via wherein electrolyte is removed from the battery via vacuum through a junction and the vacuum system, the electrolyte is treated in the treatment apparatus, and the electrolyte is returned to the battery through the vacuum system and a junction.

2. The apparatus of claim 1 wherein the vacuum generator comprises a suction pump.

3. The apparatus of claim 1 wherein the junction comprises a connector which attaches to the battery through a cell cover.

4. The apparatus of claim 1 wherein the junction comprises a T-shaped connector attached to the battery.

5. The apparatus of claim 4 wherein the T-shaped connector comprises
   an intake orifice which attaches to the return conduit;
   an intake track which communicates between the intake orifice and the battery cell;
   an outlet orifice which attaches to the removal conduit; and
   an outlet track which communicates between the battery cell and the outlet orifice.

6. The apparatus of claim 5 wherein a bypass opening is provided between the intake track and the outlet track which permits gas to pass between the intake and outlet tracks without entering the battery cell.

7. The apparatus of claim 6 wherein means are provided within the junction to assist in separation of electrolyte and gas.

8. The apparatus of claim 7 wherein the intake track includes an essentially horizontal section and an essentially vertical section, and the means to assist in separation of electrolyte and gas comprises
   the bypass opening being oriented at an uppermost position of the intake track; and
   providing a divider, bisecting the horizontal section of the intake track below the level of the opening, which directs electrolyte into the battery cell.

9. The apparatus of claim 4 wherein the intake track and the outlet track are contained in separate casings which are not attached to one another.

10. The apparatus of claim 1 wherein each cell of the battery is provided with a junction, a removal conduit, and a return conduit.

11. The apparatus of claim 10 wherein multiple junctions are arranged in series with one another, the removal conduit of one junction being the return conduit of the next junction in the series.

12. The apparatus of claim 1 wherein the treatment apparatus includes apparatus to adjust the temperature of the electrolyte before returning it to the battery.

13. The apparatus of claim 12 wherein the apparatus to adjust the temperature of the electrolyte comprises a heat exchanger.

14. The apparatus of claim 1 wherein the treatment apparatus includes means for separating and removing excess gases from electrolyte.

15. The apparatus of claim 1 wherein the treatment apparatus includes at least one filter to remove impurities from the electrolyte.

16. A method for treatment and recirculation of electrolyte from a multiple cell battery which comprises
   providing a vacuum system, including a removal conduit from the battery, a vacuum generator, and a return conduit to the battery;
   removing electrolyte from a cell of the battery via vacuum produced in the removal conduit;
   transferring the removed electrolyte to treatment apparatus for treatment; and
   returning the electrolyte to a cell of the battery by way of the return conduit.

17. The method of claim 16 wherein the treatment of the electrolyte comprises adjusting the temperature of the electrolyte.

18. The method of claim 16 wherein the treatment of the electrolyte comprises separating and removing excess gases from electrolyte.

19. The method of claim 16 wherein the treatment of the electrolyte comprises filtering the electrolyte of impurities.

20. The method of claim 16 wherein multiple cells of the battery are attached to the vacuum system to permit circulation of electrolyte among all attached cells.

21. The method of claim 20 wherein specific gravity of the electrolyte may be equalized between all attached cells during circulation.

22. The method of claim 16 wherein gases are separate from the battery cells during circulation and vented from the vacuum system.

23. The method of claim 16 wherein the vacuum system is connected to the cells by a junction each junction provided with means to permit electrolyte to flow into the battery cell and to permit gases to pass directly through the vacuum system without entering the cell, the gases separated from the battery cells during circulation and vented from the vacuum system.

* * * * *

UNITED STATES PATENT AND TRADEMARK OFFICE
CERTIFICATE OF CORRECTION

PATENT NO.   : 5,135,820
DATED        : August 4, 1992
INVENTOR(S)  : William E. M. Jones It is certified that error appears in the above-identified patent and that said Letters Patent is hereby corrected as shown below:

Col. 5, line 31:  after "provided" change "ion" to --in--.

Col. 9, line 39:  at the beginning of the line, delete "via."

Signed and Sealed this

Thirty-first Day of August, 1993

*Attest:*

BRUCE LEHMAN

*Attesting Officer*    Commissioner of Patents and Trademarks